(12) United States Patent
Sugiyama et al.

(10) Patent No.: US 7,152,920 B2
(45) Date of Patent: Dec. 26, 2006

(54) VEHICLE SEAT WITH SYSTEM FOR FACILITATING RELIEVING OF FATIGUE OF PERSON SITTING ON THE SEAT

(75) Inventors: Shinji Sugiyama, Tochigi (JP); Isao Kawashima, Tochigi (JP); Yasuchika Takei, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 10/970,175

(22) Filed: Oct. 21, 2004

(65) Prior Publication Data

US 2005/0127728 A1 Jun. 16, 2005

(30) Foreign Application Priority Data

Oct. 21, 2003 (JP) ............................. 2003-361322
Oct. 21, 2003 (JP) ............................. 2003-361323
Dec. 24, 2003 (JP) ............................. 2003-428212
Dec. 24, 2003 (JP) ............................. 2003-428215

(51) Int. Cl.
A47C 7/14 (2006.01)
A47C 7/46 (2006.01)
A47C 4/54 (2006.01)

(52) U.S. Cl. ............................ 297/284.6; 297/284.1; 297/284.3

(58) Field of Classification Search ............... 297/284.6
See application file for complete search history.

(56) References Cited

U.S. PATENT DOCUMENTS

| | | | | |
|---|---|---|---|---|
| 3,983,640 A | * | 10/1976 | Cardullo et al. | 297/284.6 X |
| 4,516,788 A | * | 5/1985 | Umetsu et al. | 297/284.6 X |
| 4,552,402 A | * | 11/1985 | Huber et al. | 297/284.6 |
| 4,580,837 A | * | 4/1986 | Bayley | 297/284.6 |
| 4,592,588 A | * | 6/1986 | Isono et al. | 297/284.6 |
| 4,634,083 A | * | 1/1987 | McKinnon | 297/284.6 X |
| 4,634,179 A | * | 1/1987 | Hashimoto et al. | 297/284.6 |
| 4,655,505 A | * | 4/1987 | Kashiwamura et al. | 297/284.6 |
| 4,707,027 A | * | 11/1987 | Horvath et al. | 297/284.6 |
| 4,833,614 A | * | 5/1989 | Saitoh et al. | 297/284.6 X |
| 4,965,899 A | * | 10/1990 | Sekido et al. | 297/284.6 |

(Continued)

FOREIGN PATENT DOCUMENTS

DE 3334864 A1 * 4/1985 ............... 297/284.6

(Continued)

*Primary Examiner*—Rodney B. White
(74) *Attorney, Agent, or Firm*—Dann, Dorfman, Herrell and Skillman, P.C.

(57) ABSTRACT

A vehicle seat includes a seat back, a seat cushion, and a system for facilitating relieving of fatigue of a person sitting on the vehicle seat for many hours. The system includes an angle sensor installed within the seat back for sensing variations in an angle of a pelvic region of the person sitting on the vehicle seat, an active device installed within the seat back for pressure-supporting the pelvic region of the person, an actuating device connected to the active device for actuating the active device and a sequential control unit electrically connected to the angle sensor and the actuating device for controlling the operation of the actuating device, the angle sensor being constructed so as to send the sequential control unit signals representing values of variations in the angle of the pelvic region of the person, the sequential control unit being constructed such that, when a value represented by a signal sent to the sequential control unit from the angle sensor is more than a predetermined value, the sequential control unit sends the actuating device a command to actuate the actuating device, whereby the active device is actuated, to thereby control supporting pressure that is applied to the pelvic region of the person.

16 Claims, 2 Drawing Sheets

U.S. PATENT DOCUMENTS

| | | | |
|---|---|---|---|
| 5,005,904 A * | 4/1991 | Clemens et al. | 297/284.6 |
| 5,082,326 A * | 1/1992 | Sekido et al. | 297/284.6 |
| 5,127,708 A * | 7/1992 | Kishi et al. | 297/284.6 X |
| 5,129,704 A * | 7/1992 | Kishi et al. | 297/284.6 X |
| 5,135,282 A * | 8/1992 | Pappers | 297/284.6 X |
| 5,170,364 A * | 12/1992 | Gross et al. | 297/284.6 X |
| 5,263,765 A * | 11/1993 | Nagashima et al. | 297/284.6 |
| 5,320,409 A * | 6/1994 | Katoh et al. | 297/284.6 |
| 5,529,377 A * | 6/1996 | Miller | 297/284.6 |
| 5,558,398 A * | 9/1996 | Santos | 297/284.6 X |
| 5,570,716 A * | 11/1996 | Kamen et al. | 297/284.6 X |
| 5,658,050 A * | 8/1997 | Lorbiecki | 297/284.6 X |
| 5,662,384 A * | 9/1997 | O'Neill et al. | 297/284.6 X |
| 5,678,891 A * | 10/1997 | O'Neill et al. | 297/284.6 |
| 5,713,631 A * | 2/1998 | O'Neill et al. | 297/284.6 |
| 5,860,699 A * | 1/1999 | Weeks | 297/284.6 |
| 5,967,608 A * | 10/1999 | Van Sickle | 297/284.6 |
| 5,975,629 A * | 11/1999 | Lorbiecki | 297/284.6 |
| 6,074,006 A * | 6/2000 | Milosic et al. | 297/284.6 |
| 6,098,000 A * | 8/2000 | Long et al. | 297/284.6 X |
| 6,129,419 A * | 10/2000 | Neale | 297/284.6 X |
| 6,203,105 B1 * | 3/2001 | Rhodes, Jr. | 297/284.6 |
| 6,299,250 B1 * | 10/2001 | Orizaris et al. | 297/284.6 |
| 6,497,454 B1 * | 12/2002 | Davidsson | 297/284.6 X |
| 6,560,803 B1 * | 5/2003 | Zur | 297/284.6 X |
| 6,612,646 B1 * | 9/2003 | Gunther et al. | 297/284.6 X |
| 6,682,059 B1 * | 1/2004 | Daniels et al. | 297/284.6 X |
| 6,782,573 B1 * | 8/2004 | Odderson | 297/284.6 X |
| 6,851,755 B1 * | 2/2005 | Dinkel et al. | 297/284.6 X |
| 2002/0079726 A1* | 6/2002 | Garber et al. | 297/284.6 |
| 2002/0180249 A1* | 12/2002 | Felton et al. | 297/284.6 |
| 2003/0038517 A1* | 2/2003 | Moran et al. | 297/284.6 |
| 2004/0174056 A1* | 9/2004 | Gryp et al. | 297/284.6 |
| 2004/0189070 A1* | 9/2004 | Ladron De Guevara | 297/284.6 |
| 2005/0067868 A1* | 3/2005 | Kern et al. | 297/284.6 |
| 2005/0082895 A1* | 4/2005 | Kimmig | 297/284.6 X |

FOREIGN PATENT DOCUMENTS

| | | | |
|---|---|---|---|
| JP | 59230833 A * | 12/1984 | 297/284.6 |
| JP | 61291233 A * | 12/1986 | 297/284.6 |
| JP | 04187106 A * | 7/1992 | 297/284.6 |
| JP | 05038307 A * | 2/1993 | 297/284.6 |
| JP | 06284942 A * | 10/1994 | 297/284.6 |
| JP | 06286508 A * | 10/1994 | 297/284.6 |
| JP | 7313293 | 12/1995 | |

* cited by examiner

VEHICLE SEAT WITH SYSTEM FOR FACILITATING RELIEVING OF FATIGUE OF PERSON SITTING ON THE SEAT

BACKGROUND OF THE INVENTION

1. Field of the Invention

This invention relates to a vehicle seat which is provided with a system for facilitating relieving of fatigue of a person sitting on the vehicle seat for many hours, for example, relieving lumbago (hereinafter referred to as "fatigue relieving system").

2. Description of the Related Art

It has been stated that fatigue of a person sitting on a vehicle seat while driving for many hours may result from a rise in pressure applied to the intervertebral disk of the person, tonus of the skeletal muscles of the person, application of load to the person's skin and skeletal muscles by application of pressure to a part of the person's body, etc.

Recently, a need has arisen in the vehicle industry for a vehicle seat that is provided with a fatigue relieving system. As one of fatigue relieving systems, there has been proposed a fatigue relieving system that includes an air-bag housed within a region of a seat back of a seat for pressure-supporting the lumbar region of a person sitting on the seat, and an air-compressor connected to the air-bag. This fatigue relieving system is disclosed in Japanese Patent Application Laid-Open No. Hei. 7-313293.

In the conventional fatigue relieving system, supporting pressure applied to the lumbar region of the person sitting on the seat is adapted to be controlled by adjusting an internal pressure in the air-bag, whereby fatigue of the person is relieved. The internal pressure of the air-bag is adjusted by the supply of air to the air-bag and suction of air from the air-bag. The supply and suction of air is adapted to be performed by actuating a normally open point-of-contact switch for the air-compressor that is of an autoclear-type.

In the conventional fatigue relieving system, unless the person feels fatigued, the normally open point-of-contact switch may not be actuated by the person. Therefore, with the fatigue relieving system, it is hard to previously and effectively relieve the person's fatigue. Furthermore, it is hard to effectively relieve fatigue of the person with the air-bag installed within the seat back.

Given the foregoing, it would be desirable to provide a fatigue relieving system that can previously and effectively relieve fatigue of a person sitting on a vehicle seat.

SUMMARY OF THE INVENTION

It is therefore an object of the present invention to provide a vehicle seat with a fatigue relieving system which can previously and effectively relieve fatigue of a person sitting on a seat for many hours, which results from a rise in pressure applied to the intervertebral disk of the person, tonus of the skeletal muscles of the person, application of load to the person's skin and skeletal muscles by application of pressures to a part of the person's body, etc.

In accordance with the present invention, there is provided a vehicle seat that comprises a seat back, a seat cushion, and a system for facilitating relieving of fatigue of a person sitting on the vehicle seat for many hours. The system comprises an angle sensor installed within the seat back for sensing variations in an angle of a pelvic region of the person sitting on the vehicle seat, active means installed within the seat back for pressure-supporting the pelvic region of the person, actuating means connected to the active means for actuating the active means, and sequential control means electrically connected to the angle sensor and the actuating means for controlling the operation of the actuating means, the angle sensor being constructed so as to send the sequential control means signals representing values of variations in the angle of the pelvic region of the person, and the sequential control means being constructed such that, when a value represented by a signal sent to the sequential control means from the angle sensor is more than a predetermined value, the sequential control means sends the actuating means a command to actuate the actuating means, whereby the active means is actuated, to thereby control supporting pressure that is applied to the pelvic region of the person.

The system may include second active means for pressure-supporting a lumbar vertebra region of the person. The second active means is installed within the seat back and connected to the actuating means.

The system may further include third active means installed within the seat cushion for pressure-supporting hipbone knot regions of the person, second actuating means connected to the third active means for actuating the third active means, and control means for controlling the operation of the second actuating means, the control means being electrically connected to the second actuating means.

The system may still further include fourth active means installed within the seat cushion for pressure-supporting lower parts of femoral regions of the person, the fourth active means connected to the second actuating means.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE PREFERRED EMBODIMENT

Now, a vehicle seat with a fatigue relieving system according to the present invention will be discussed hereinafter with reference to the accompanying drawings.

Figure 1:
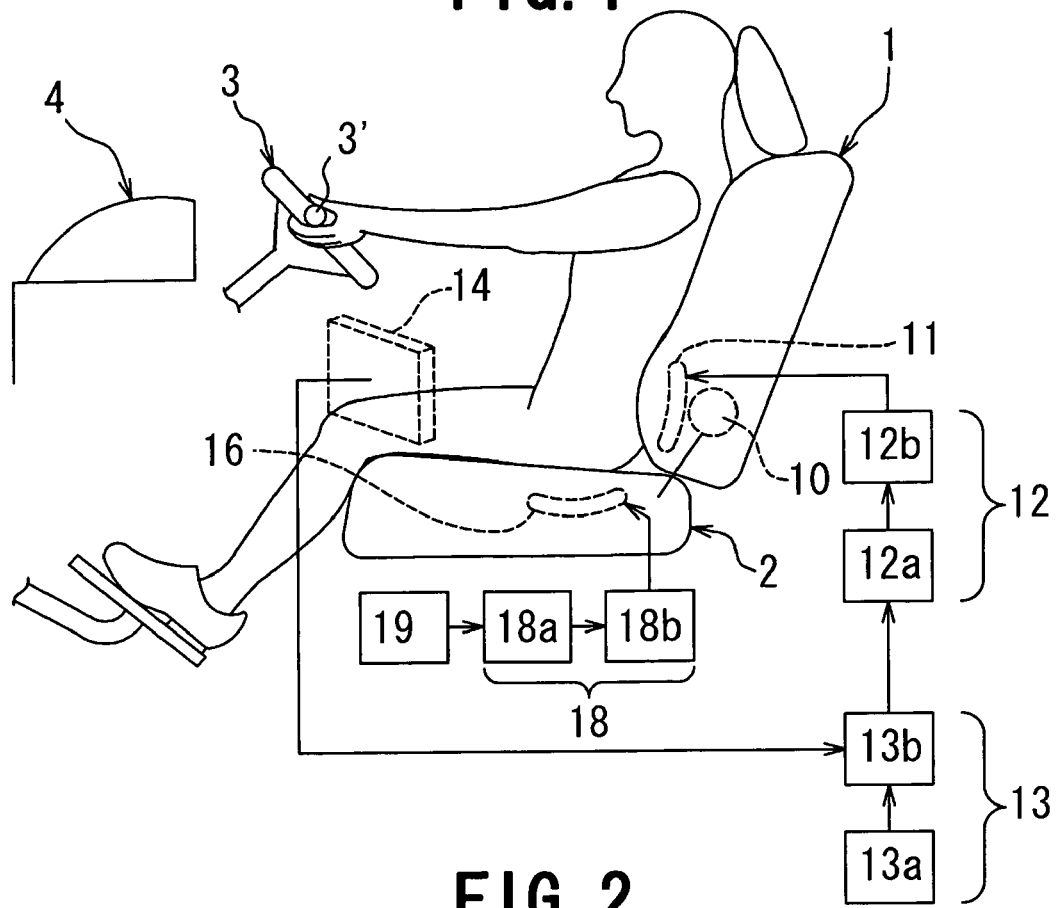
FIG. 1 is a schematic view of assistance in explaining a vehicle seat provided with a fatigue relieving system according to an embodiment of the present invention.

FIG. 1 illustrates a driver's seat which is provided with the fatigue relieving system. In FIG. 1, reference numeral 1 denotes a seat back of the driver's seat, reference numeral 2 designates a seat cushion of the driver's seat, reference numeral 3 denotes a handle, and reference numeral 4 denotes an instrument panel.

The fatigue relieving system generally includes an angle sensor 10 for sensing variations in an angle of the pelvic region of the person driving while sitting on the seat, active means 11 for pressure-supporting the pelvic region of the person, actuating means 12 for actuating the active means 11, and sequential control means 13 for controlling the operation of the actuating means 12 to control the operation of the active means 11. The angle sensor 10 is electrically connected to the sequential control means 13 and installed within a region of the seat back 1 which positionally corresponds to the pelvic region of the person when the person sits on the seat. The active means 11 is connected to the actuating means 12. The actuating means 12 is electrically connected to the sequential control means 13.

Throughout this application, unless otherwise indicated, the term "pelvic region" means regions of the person's body which include the sacral region of the person and the 3rd lumbar vertebral region of the person.

In the vehicle seat according to the present invention, start operation of the fatigue relieving system is performed by turning a power switch (not shown) on. Prior to the start operation of the fatigue relieving system, posture of the seat is adjusted so that the posture of the seat is brought into a suitable condition where the person can sit on the seat. After the power switch is turned on, the person moves the person's upper body several times in a condition where the person sits on the vehicle seat, in order to simulate movement of the person's pelvic region during driving of the vehicle. Signals representing values of the changes in the angle of the person's pelvic region that are made by the movement of the person's upper body are then sent to the sequential control means 13 from the angle sensor 10. In the sequential control means 13, a threshold limit value is obtained on the basis of the signals and set.

When a value of variation in the angle of the person's pelvic region that is sensed by the angle sensor 10 and sent to the sequential control means 13 from the angle sensor 10 during actual driving of the vehicle is more than the threshold limit value, the sequential control means 13 sends the actuating means 12 a command to actuate the active means 11.

Incidentally, a display 14 for inputting any necessary data into the sequential control means 13 in order to set control conditions for the actuating means 12 is electrically connected to the sequential control means 13. The display 14 has a touch surface and can input the necessary data into the sequential control means 13 by touching the touch surface by the person's finger or a touch pen.

The sequential control means 13 comprises a sequential control section 13*a* electrically connected to the angle sensor 11 for performing control in predetermined order, and a programming section 13*b* electrically connected to the actuating means 12 for sending a command to the actuating means 12.

In the illustrated example, as the active means 11, there is employed an air-bag. The air bag 11 is installed within the region of the seat back 1 which positionally corresponds to the pelvic region of the person when the person sits on the seat. The actuating means 12 for actuating the active means 11 comprises an air-compressor 12*a* connected to the air bag 11, and a solenoid valve 12*b* arranged between the air bag 11 and the air-compressor 12*a*. The air-compressor 12*a* is electrically connected to the programming section 13*b* and constructed so as to supply air to the air bag 11 and suck air from the air bag 11, according to a command supplied from the programming section 13*b*. The solenoid valve 12*b* is electrically connected to the programming section 12*b* and constructed so as to be actuated according to a command supplied from the programming section 13*b*. The air bag 11 is adapted to be inflated by the supply of air to the air-bag from the air-compressor 12*a* and adapted to be deflated by the suction of air from the air-bag by the air-compressor 12*a*, whereby supporting pressure applied to the pelvic region of the person by the air-bag 11 is changed, thus facilitating relieving of fatigue of the person.

Incidentally, when data on, for example, control conditions for repeated supply and suck of air are inputted into the programming section 13*b* from the display 14 and the control conditions are previously set, the air-bag 11 is actuated so as to be repeatedly inflated and deflated on the basis of the control conditions, whereby supporting pressure applied to the pelvic region of the person by the air-bag 11 is repeatedly changed. This enables the circulation of the blood of the person to be quickened and fatigue of the person to be relieved. When predetermined operation of the air-bag 11 is completed, it is displayed on the touch surface of the display 14 that the operation of the fatigue relieving system has been terminated. Thus, the fatigue relieving system is brought into a reset condition and the screen of the display 14 returns to an initial screen.

Incidentally, the air-bag 11 may be provided with an adjusting switch (not shown) for controlling internal pressure of the air-bag 11, which is manually operated. A second sensor 3' for sensing perspiration of the person may be installed in the handle 3 and electrically connected to the sequential control means 13. In this case, the sequential control means 13 is constructed such that it sends the actuating means 12 a command to cause the air-bag 11 to be actuated when the second sensor 3' senses the perspiration of the person driving the vehicle while grasping the handle 3 and sitting on the vehicle seat and sends the sequential control means 13 a signal representing the perspiration of the person.

Figure 2:
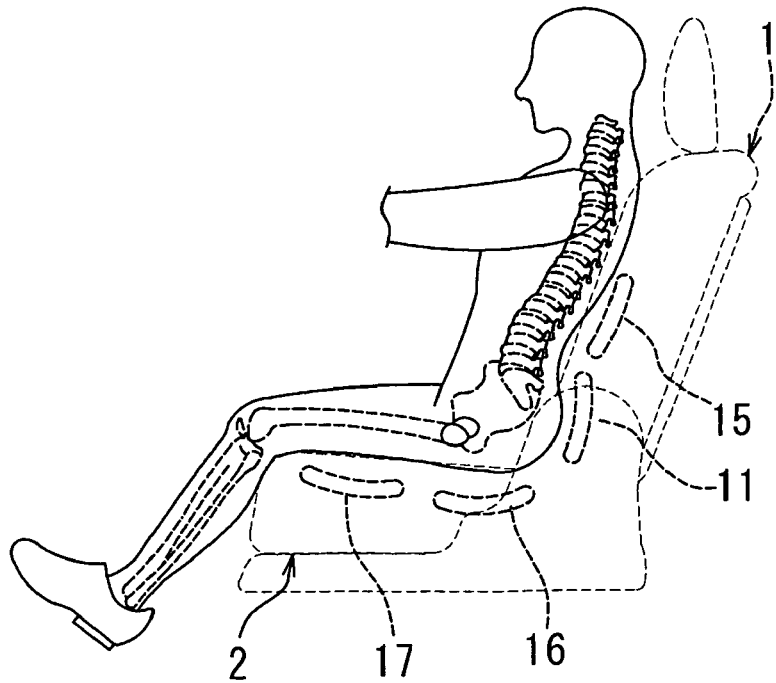
FIG. 2 is a schematic view of assistance in explaining a positional relationship between the skeleton of a person sitting on the seat of FIG. 1, and the fatigue relieving system.

Referring to FIG. 2, the vehicle seat may be provided with a second active means 15 for pressure-supporting the lumbar vertebra region of the person, and third and fourth active means 16, 17 for pressure-supporting the weight of the person, in addition to the first active means 11.

The second active means 15 is installed within a region of the seat back 1 that positionally corresponds to the lumbar vertebra region of the person when the person sits on the vehicle seat. The third active means 16 is installed within a region of the seat cushion 2 that, when the person sits on the vehicle seat, positionally corresponds to the hipbone knot regions of the person to which load tending to cause the person to feel a pain may be applied. The fourth active means 17 is installed within a region of the seat cushion 2 that positionally corresponds to the lower parts of the femoral regions of the person when the person sits on the vehicle seat. The second active means 15 is connected to the actuating means 12 and adapted to be actuated in the same manner as the first active means 11 is done by the actuating means 12. The second active means 15 comprises a second air-bag.

In the illustrated example, the third and fourth active means 16, 17 comprise a third air-bag and a fourth air-bag, respectively. The third and fourth air-bags 16, 17 are adapted to be actuated by a second actuating means 18. The second actuating means 18 comprises a second air-compressor 18*a* and a second solenoid valve 18*b*. The second air-compressor 18*a* is connected through the second solenoid valve 18*b* to the third and fourth air-bags 16, 17. The third and fourth air-bags 16, 17 are provided with pressure sensors (not shown) for sensing internal pressure within the third and fourth air-bags 16, 17. The second air-compressor 18*a* and the second solenoid valve 18*b* are electrically connected to control means 19 for controlling the operation of the second air-compressor 18*a* and the second solenoid valve 18*b*. A reference level for the internal pressure within the third and fourth air-bags 16, 17 is previously stored in the control means 19. The reference level is determined on the basis of body pressure of a person of relatively light weight that is applied to the seat cushion 2 when the person sits on the vehicle seat. The pressure sensors of the third and fourth air-bags 16, 17 are electrically connected to the control means 19 and adapted to send the control means 19 signals representing values of the internal pressure within the third and fourth air-bags 16, 17. The control means 19 is constructed such that, when internal pressure levels of the air-bags 16, 17 that are represented by signals sent from the pressure sensors to the control means 19 do not coincides with the reference level, the control means 19 sends the second air-compressor 18*a* a command to actuate the second air-compressor 18*a*, whereby the internal pressure within the air-bags 16, 17 can be suitably controlled according to the weight of the person sitting on the vehicle seat.

Figure 3:
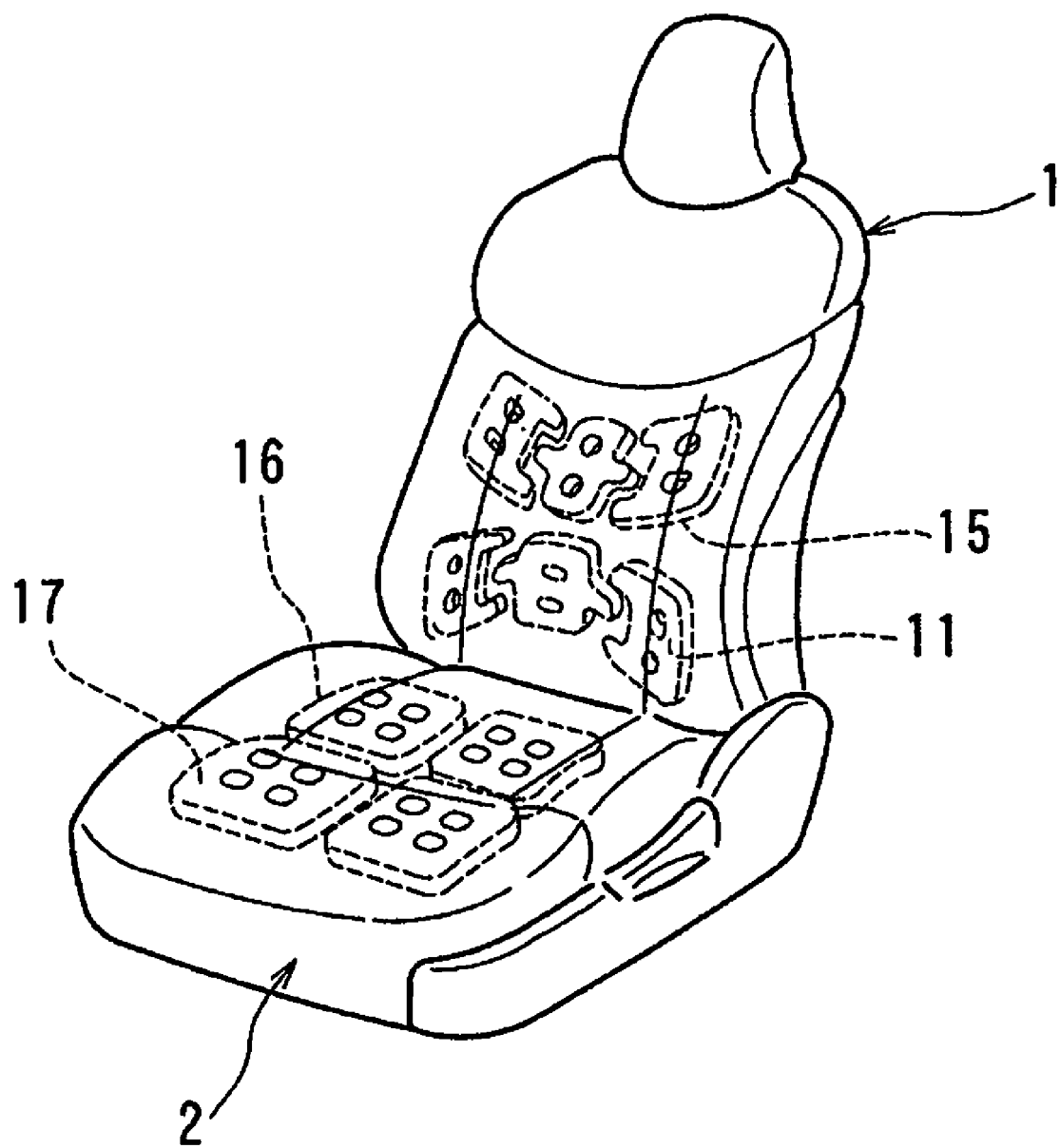
FIG. 3 is a schematic view of assistance in explaining a construction of active means of the fatigue relieving system.

Incidentally, each of the first, second, third and fourth air-bags 11, 15, 16, 17 may be constructed so as to have a plurality of air-passages, for example, air-passages which are arranged together so as to take the form of a checkerboard pattern. As shown in FIG. 3, each of the first, second, third and fourth air-bags 11, 15, 16, 17 may comprise a plurality of air-bag sections which are formed independently from one another and connected to the corresponding air-compressors. While the air-bags 11, 15 are employed as the first and second active means in the above-mentioned embodiment, any suitable pressing plates serving as lumbar supports may be employed in lieu of the air-bags 11, 15. Furthermore, while the present invention is discussed above in connection with the driver's seat, the present invention may be applied to assistant seats and front and rear seats other than the driver's seat.

The terms and expressions that have been employed are used as terms of description and not of limitation. There is no intention in the use of such terms and expressions to exclude any equivalents of the features described or any portions thereof. It is recognized, however, that various modifications are possible within the scope of the invention claimed.

What is claimed is:

1. A seat for a vehicle, comprising a seat back, a seat cushion, and a system for facilitating relieving of fatigue of a person driving said vehicle while grasping a handle of said vehicle and sitting on the vehicle seat for many hours;

said system comprising:

a first sensor installed within said seat back for sensing variations in angle of a pelvic region of the person sitting on said vehicle seat;

first active means installed within said seat back for pressure-supporting the pelvic region of the person, said first active means comprising a first air-bag having a plurality of first air-passages which are arranged together so as to take the form of a checkerboard pattern;

first actuating means connected to said first active means for actuating said first active means;

a second sensor installed in said handle of said vehicle for sensing perspiration of the person; and sequential control means electrically connected to said first and second sensors and said first actuating means for controlling the operation of said first actuating means;

said first sensor being constructed so as to send said sequential control means a first signal representing a value that corresponds to a variation in the angle of the pelvic region of the person;

said second sensor being constructed such that it sends said sequential control means a second signal representing the perspiration of the person when said second sensor senses the perspiration of the person;

said sequential control means being constructed such that, when the value represented by the first signal sent to said sequential control means from said first sensor is more than a predetermined value, said sequential control means sends said first actuating means a first command to actuate said first actuating means and, when said second sensor senses the perspiration of the person and sends said sequential control means the second signal representing the perspiration of the person, said sequential control means sends said first actuating means a second command to actuate said first actuating means; and said first actuating means being constructed so as to supply air or suction to said first air-bag according to the first and second commands from said sequential control means, thereby causing said first air-bag to be inflated or deflated, so that supporting pressure that is applied to the pelvic region of the person by said first active means can be controlled.

2. A seat for a vehicle according to claim 1, wherein said system further includes second active means for pressure-supporting a lumbar vertebra region of the person, said second active means being installed within said seat back and connected to said first actuating means, said second active means comprising a second air-bag, said second air-bag having a plurality of second air-passages which are arranged together so as to take the form of a checkerboard pattern, and said first actuating means being constructed so as to supply air or suction to said second air-bag according to the first and second commands from said sequential control means, thereby causing said second air-bag to be inflated or deflated, so that supporting pressure that is applied to the lumbar vertebra region of the person by said second active means can be controlled.

3. A seat for a vehicle according to claim 2, wherein said system further includes third active means installed within said seat cushion for pressure-supporting hipbone knot regions of the person, said third active means comprising a third air-bag, said third air-bag having a plurality of third air-passages which are arranged together so as to take the form of a checkerboard pattern, second actuating means connected to said third active means for actuating said third active means, and control means for controlling the operation of said second actuating means, said control means being electrically connected to said second actuating means.

4. A seat for a vehicle according to claim 3, wherein said system further includes fourth active means installed within said seat cushion and connected to said second actuating means for pressure-supporting lower parts of femoral regions of the person, said fourth active means comprising a fourth air-bag, said fourth air-bag having a plurality of fourth air-passages which are arranged together so as to take the form of a checkerboard pattern.

5. A seat for a vehicle according to claim 2, wherein said system further includes third active means installed within said seat cushion for pressure-supporting lower parts of femoral regions of the person, said third active means comprising a third air-bag, said third air-bag having a plurality of third air-passages which are arranged together so as to take the form of a checkerboard pattern, second actuating means connected to said third active means for actuating said third active means, and control means for controlling the operation of said second actuating means, said control means being electrically connected to said second actuating means.

6. A seat for a vehicle according to claim 1, wherein said system further includes second active means installed within said seat cushion for pressure-supporting hipbone knot regions of the person, said second active means comprising a second air-bag, said second air-bag having a plurality of second air-passages which are arranged together so as to take the form of a checkerboard pattern, second actuating means connected to said second active means for actuating said second active means, and control means for controlling the operation of said second actuating means, said control means being electrically connected to said second actuating means.

7. A seat for a vehicle according to claim 6, wherein said system further includes third active means installed within said seat cushion and connected to said second actuating means for pressure-supporting lower parts of femoral regions of the person, said third active means comprising a third air-bag, said third air-bag having a plurality of third air-passages which are arranged together so as to take the form of a checkerboard pattern.

8. A seat for a vehicle according to claim 1, wherein said system further includes second active means installed within said seat cushion for pressure-supporting lower parts of femoral regions of the person, said second active means comprising a second air-bag, said second air-bag having a plurality of second air-passages which arranged together so as to take the form of a checkerboard pattern, second actuating means connected to said second active means for actuating said second active means, and control means for controlling the operation of said second actuating means, said control means being electrically connected to said second actuating means.

9. A seat for a vehicle, comprising a seat back, a seat cushion, and a system for facilitating relieving of fatigue of a person driving the vehicle while grasping a handle of said vehicle and sitting on the vehicle seat for many hours;

said system comprising:
a first sensor installed within said seat back for sensing variations in an angle of a pelvic region of the person sitting on said vehicle seat;
first active means installed within said seat back for pressure-supporting the pelvic region of the person;
first actuating means connected to said first active means for actuating said first active means;
a second sensor installed in said handle of said vehicle for sensing perspiration of the person; and
sequential control means electrically connected to said first and second sensors and said first actuating means for controlling the operation of said first actuating means;
said first sensor being constructed so as to send said sequential control means a first signal representing a value that corresponds to a variation in the angle of the pelvic region of the person;
said second sensor being constructed such that it sends said sequential control means a second signal representing the perspiration of the person when said second sensor senses the perspiration of the person;
said sequential control means being constructed such that, when the value represented by the first signal sent to said sequential control means from said first sensor is more than a predetermined value, said sequential control means sends said first actuating means a first command to actuate said first actuating means and, when said second sensor senses the perspiration of the person and sends said sequential control means the second signal representing the perspiration of the person, said sequential control means sends said first actuating means a second command to actuate said first actuating means; and
said first actuating means being constructed so as to actuate said first active means according to the first and second commands from said sequential control means, so that supporting pressure that is applied to the pelvic region of the person by said first active means can be controlled.

10. A seat for a vehicle according to claim 9, wherein said system further includes second active means for pressure-supporting a lumbar vertebra region of the person, said second active means being installed within said seat back and connected to said first actuating means, and said first actuating means being constructed so as to actuate said second active means according to the first and second commands from said sequential control means, so that supporting pressure that is applied to the lumbar vertebra region of the person by said second active means can be controlled.

11. A seat for a vehicle according to claim 10, wherein said system further includes third active means installed within said seat cushion for pressure-supporting hipbone knot regions of the person, second actuating means connected to said third active means for actuating said third active means, and control means for controlling the operation of said second actuating means, said control means being electrically connected to said second actuating means.

12. A seat for a vehicle according to claim 11, wherein said system further includes fourth active means installed within said seat cushion and connected to said second actuating means for pressure-supporting lower parts of femoral regions of the person.

13. A seat for a vehicle according to claim 10, wherein said system further includes third active means installed within said seat cushion for pressure-supporting lower parts of femoral regions of the person, second actuating means connected to said third active means for actuating said third active means, and control means for controlling the operation of said second actuating means, said control means being electrically connected to said second actuating means.

14. A seat for a vehicle according to claim 9, wherein said system further includes second active means installed within said seat cushion for pressure-supporting hipbone knot regions of the person, second actuating means connected to said second active means for actuating said second active means, and control means for controlling the operation of said second actuating means, said control means being electrically connected to said second actuating means.

15. A seat for a vehicle according to claim 14, wherein said system further includes third active means installed within said seat cushion and connected to said second actuating means for pressure-supporting lower parts of femoral regions of the person.

16. A seat for a vehicle according to claim 9, wherein said system further includes second active means installed within said seat cushion for pressure-supporting lower parts of femoral regions of the person, second actuating means connected to said second active means for actuating said second active means, and control means for controlling the operation of said second actuating means, said control means being electrically connected to said second actuating means.

* * * * *